United States Patent
Wade et al.

(10) Patent No.: US 10,923,917 B2
(45) Date of Patent: Feb. 16, 2021

(54) SYSTEM AND METHOD FOR UTILITY ENERGY STORAGE AND DISTRIBUTION

(71) Applicant: Electric Power Board, an Independent Board of the City of Chattanooga, Chattanooga, TN (US)

(72) Inventors: David Wade, Chattanooga, TN (US); Jim Ingraham, Chattanooga, TN (US); Lilian Bruce, Chattanooga, TN (US); William E. Copeland, Chattanooga, TN (US)

(73) Assignee: Electric Power Board, an Independent Board of the City of Chattanooga, Chattanooga, TN (US)

( * ) Notice: Subject to any disclaimer, the term of this patent is extended or adjusted under 35 U.S.C. 154(b) by 61 days.

(21) Appl. No.: 16/415,716

(22) Filed: May 17, 2019

(65) Prior Publication Data

US 2019/0356133 A1   Nov. 21, 2019

Related U.S. Application Data

(60) Provisional application No. 62/672,679, filed on May 17, 2018.

(51) Int. Cl.
| | |
|---|---|
| *H02J 3/38* | (2006.01) |
| *H02J 7/35* | (2006.01) |
| *H02J 3/28* | (2006.01) |

(52) U.S. Cl.
CPC ............... *H02J 3/383* (2013.01); *H02J 3/28* (2013.01); *H02J 7/35* (2013.01)

(58) Field of Classification Search
None
See application file for complete search history.

(56) References Cited

U.S. PATENT DOCUMENTS

| 9,960,637 B2* | 5/2018 | Sanders | H02J 3/381 |
| 2008/0272934 A1* | 11/2008 | Wang | G08B 25/10 340/870.11 |
| 2013/0274936 A1* | 10/2013 | Donahue | H02J 13/00028 700/291 |
| 2014/0094984 A1* | 4/2014 | Dykeman | H02J 13/00017 700/295 |
| 2015/0066231 A1* | 3/2015 | Clifton | H02J 3/382 700/296 |
| 2019/0234305 A1* | 8/2019 | Ramamurthy | H02J 15/00 |

* cited by examiner

*Primary Examiner* — Cassandra F Cox
(74) *Attorney, Agent, or Firm* — Chambliss, Bahner & Stophel, P.C.

(57) ABSTRACT

A system and method for storing and distributing energy including an energy generation source that is adapted to generate a supply level, an energy consumer that has a demand level, an energy storage unit that is adapted to receive and store a first portion of the energy and distribute a second portion of energy, an e-cloud that is adapted to receive a third portion of the energy and distribute a fourth portion of the energy, a processor that is adapted to control the distribution of energy to and from the energy storage unit, and a utility that is adapted to communicate with the system. The processor causes energy to be stored in the energy storage unit and received by the e-cloud when the supply level of energy exceeds the demand level and causes energy to be distributed to the energy consumer when the demand level exceeds the supply level.

20 Claims, 7 Drawing Sheets

SYSTEM AND METHOD FOR UTILITY ENERGY STORAGE AND DISTRIBUTION

CROSS-REFERENCES TO RELATED APPLICATIONS/PATENTS

This application relates back to and claims the benefit of priority from U.S. Provisional Application for Patent Ser. No. 62/672,679 titled "Aggregated Energy Storage and Distribution System" and filed on May 17, 2018.

FIELD OF THE INVENTION

The present invention relates generally to systems and methods for storing and distributing utility energy, and particularly to systems and methods for storing and distributing solar energy.

BACKGROUND AND DESCRIPTION OF THE PRIOR ART

It is known to use systems and methods to store and distribute energy from a utility system. Conventional systems and methods, however, suffer from one or more disadvantages. For example, conventional systems and methods do not effectively and efficiently store output from distributed energy resources (DER) with high output variability such as solar panels. Conventional systems and methods also do not effectively and efficiently distribute DER to utility consumers. In addition, conventional systems and methods do not provide sufficient resiliency, redundancy, or flexibility and do not sufficiently minimize the use of utility assets and losses. As a result, conventional systems and methods do not effectively or efficiently address service disruptions and outages. Further, conventional systems and methods do not effectively and efficiently optimize the value of DER or solar panel installations. Still further, conventional systems and methods result in excessive overhead costs and wear and tear on the system and its component parts. In addition, conventional systems and methods undesirably have an adverse impact on the environment. Conventional systems and methods also do not allow a utility to use a consumer's excess or surplus energy during periods when the energy is most valuable to the utility.

It would be desirable, therefore, if a system and method for the storage and distribution of utility energy could be provided that would effectively and efficiently store and distribute output from DER with high output variability such as solar panels. It would be further desirable if such a system and method for the storage and distribution of utility energy could be provided that would provide sufficient resiliency, redundancy, and flexibility and sufficiently minimize the use of utility assets and losses. It would be still further desirable if such a system and method for the storage and distribution of utility energy could be provided that would effectively and efficiently address service disruptions and outages. In addition, it would be desirable if such a system and method for the storage and distribution of utility energy could be provided that would optimize the value of DER and solar panel installations. It would also be desirable if such a system and method for the storage and distribution of utility energy could be provided that would minimize overhead costs and wear and tear on the system and its component parts. It would be further desirable if such a system and method for the storage and distribution of utility energy could be provided that would minimize any adverse impacts on the environment. It would be still further desirable if such a system and method for the storage and distribution of utility energy could be provided that would allow a utility to use a consumer's excess or surplus energy during periods when the energy is most valuable to the utility.

Advantages of the Preferred Embodiments of the Invention

Accordingly, it is an advantage of the preferred embodiments of the invention claimed herein to provide a system and method for the storage and distribution of utility energy that effectively and efficiently stores and distributes output from DER with high output variability such as solar panels. It is also an advantage of the preferred embodiments of the invention claimed herein to provide a system and method for the storage and distribution of utility energy that provides sufficient resiliency, redundancy, and flexibility and sufficiently minimizes the use of utility assets and losses. It is another advantage of the preferred embodiments of the invention claimed herein to provide a system and method for the storage and distribution of utility energy that effectively and efficiently addresses service disruptions and outages. It is still another advantage of the preferred embodiments of the invention claimed herein to provide a system and method for the storage and distribution of utility energy that optimizes the value of DER and solar panel installations. In addition, it is an advantage of the preferred embodiments of the invention claimed herein to provide a system and method for the storage and distribution of utility energy that minimizes overhead costs and wear and tear on the system and its component parts. It is also an advantage of the preferred embodiments of the invention claimed herein to provide a system and method for the storage and distribution of utility energy that minimizes any adverse impacts on the environment. It is a further advantage of the preferred embodiments of the invention claimed herein to provide a system and method for the storage and distribution of utility energy that allows a utility to use a consumer's excess or surplus energy during periods when it is most valuable to the utility.

Additional advantages of the preferred embodiments of the invention will become apparent from an examination of the drawings and the ensuing description.

Explanation of the Technical Terms

The use of the terms "a," "an," "the," and similar terms in the context of describing the invention are to be construed to cover both the singular and the plural, unless otherwise indicated herein or clearly contradicted by context. The terms "comprising" "having," "including," and "containing" are to be construed as open-ended terms (i.e., meaning "including, but not limited to,") unless otherwise noted. The terms "substantially," "generally," and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

The use of any and all examples or exemplary language (e.g., "such as," "preferred," and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

The term "e-cloud" means any type of distributed resource such as a server. The term "e-cloud" includes, without limitation, a plurality of public and/or private servers that are located at one or more locations (on-site or remote) and are hosted by and accessible to a utility. The term "e-cloud" also includes, without limitation, federated and/or cooperative architecture and gateways for cached data. The preferred "e-cloud" is adapted to reduce energy consumption by the energy consumer and the utility, reduce the cost of storage for the energy consumer and the utility, and provide improved continuity of operations, system durability, system redundancy, scalability, and disaster recovery.

SUMMARY OF THE INVENTION

The apparatus of the invention comprises an energy distribution system for storing and distributing an amount of utility energy. The preferred energy distribution system comprises an energy generation source that is adapted to generate a supply level of the amount of utility energy and transmit said supply level of the amount of utility energy to the energy distribution system, an energy consumer that has a demand level of the amount of utility energy, an energy storage unit that is adapted to receive and store a first portion of the amount of utility energy from the energy generation source and distribute a second portion of the amount of utility energy to the energy consumer, an e-cloud that is adapted to receive a third portion of the amount of utility energy from the energy generation source and distribute a fourth portion of the amount of utility energy to the energy consumer, a processor that is adapted to control the distribution of the amount of utility energy to and from the energy storage unit and the e-cloud, and a utility that is adapted to communicate with the energy distribution system for storing and distributing an amount of utility energy. In the preferred embodiments of the system, the processor causes the first portion of the amount of utility energy to be stored in the energy storage unit and the third portion of the amount of utility energy to be received by the e-cloud when the supply level of the amount of utility energy exceeds the demand level of the energy consumer and causes the second portion of the amount of utility energy and the fourth portion of the amount of utility energy to be distributed to the energy consumer when the demand level of the energy consumer exceeds the supply level of the energy generation source.

The method of the invention comprises a method for storing and distributing an amount of utility energy. The preferred method comprises providing an energy distribution system for storing and distributing an amount of utility energy. The preferred system comprises an energy generation source that is adapted to generate a supply level of the amount of utility energy and transmit said supply level of the amount of utility energy to the energy distribution system, an energy consumer that has a demand level of the amount of utility energy, an energy storage unit that is adapted to receive and store a first portion of the amount of utility energy from the energy generation source and distribute a second portion of the amount of utility energy to the energy consumer, an e-cloud that is adapted to receive a third portion of the amount of utility energy from the energy generation source and distribute a fourth portion of the amount of utility energy to the energy consumer, a processor that is adapted to control the distribution of the amount of utility energy to and from the energy storage unit and the e-cloud, and a utility that is adapted to communicate with the system for storing and distributing an amount of utility energy. In the preferred embodiments of the system, the processor causes the first portion of the amount of utility energy to be stored in the energy storage unit and the third portion of the amount of utility energy to be received by the e-cloud when the supply level of the amount of utility energy exceeds the demand level of the energy consumer and causes the second portion of the amount of utility energy and the fourth portion of the amount of utility energy to be distributed to the energy consumer when the demand level of the energy consumer exceeds the supply level of the energy generation source. The preferred method further comprises controlling the storage of the first portion of the amount of utility energy and the distribution of the second portion of the amount of utility energy.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
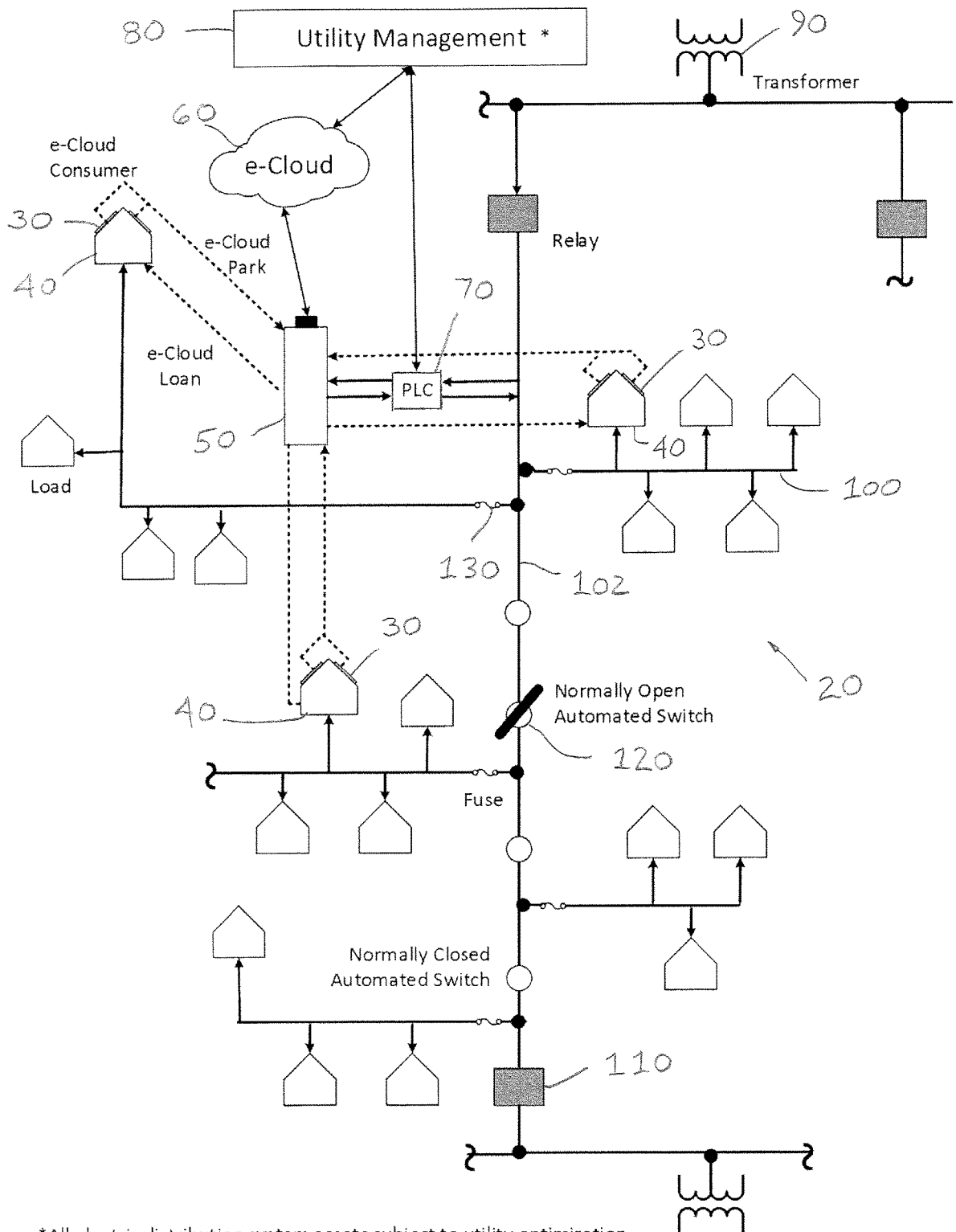
FIG. 1 is a schematic view of the preferred embodiment of the system for storing and distributing an amount of utility energy in accordance with the present invention.

Referring now to the drawings, the preferred embodiments of the material control device in accordance with the present invention is illustrated by FIGS. 1, 2, 3, 4, and 5. Referring now to FIG. 1, a schematic view of the preferred embodiment of the system for storing and distributing an amount of utility energy in accordance with the present invention is illustrated. As shown in FIG. 1, the preferred system is designated generally by reference numeral 20. Preferred energy distribution system 20 comprises an energy generation source such as solar panels 30, each of which is adapted to generate a supply level of the amount of utility energy and transmit said supply level of the amount of utility energy to the energy generation system. Preferably, the energy generation source is an intermittent energy generation source. Preferred system also comprises an energy consumer such as residential homes 40, each of which has a demand level of the amount of utility energy. Preferred energy distribution system 20 further comprises an energy storage unit such as battery 50. Preferred battery 50 is adapted to receive and store a first portion of the amount of utility energy from the energy generation source and distribute a second portion of the amount of utility energy to the energy consumer. In addition, preferred energy distribution system 20 comprises a plurality of distributed resources or servers such as e-cloud 60. Preferred e-cloud 60 is adapted to receive a third portion of the amount of utility energy from the energy generation source and distribute a fourth portion of the amount of utility energy to the energy consumer. Preferred energy distribution system 20 still further comprises a processor such as programmable logic controller (PLC) 70. Preferred PLC 70 is adapted to control the distribution of the amount of utility energy to and from the energy storage unit and the e-cloud. Preferred energy distribution system 20 also comprises a utility 80. Preferred utility 80 is adapted to communicate with the energy distribution system for storing and distributing an amount of energy and control the energy storage unit.

Still referring to FIG. 1, preferred energy distribution system 20 comprises transformer/inverter 90, a cable such as underground cable 100 or above ground cable 102, relay 110, switch 120, and fuse 130.

Still referring to FIG. 1, in preferred energy distribution system 20, the processor causes a portion of the amount of utility energy to be stored in the energy distribution system when the supply level of the amount of utility energy exceeds the demand level of the energy consumer. More particularly, in preferred energy distribution system 20, the processor causes a first portion of the amount of utility energy to be stored in the energy storage unit and a third portion of the amount of utility energy to be received in the e-cloud when the supply level of the amount of utility energy exceeds the demand level of the energy consumer. Also in the preferred energy distribution system 20, the processor causes a portion of the amount of utility energy to be distributed to the energy consumer when the demand level of the energy consumer exceeds the supply level of the energy generation source. More particularly, in preferred energy distribution system 20, the processor causes a second portion of the amount of utility energy from the energy storage unit and a fourth portion of the amount of utility energy to be distributed to the energy consumer when the demand level of the energy consumer exceeds the supply level of the energy generation source. It is also contemplated within the scope of the invention that preferred energy distribution system 20 is adapted to distribute a portion of the utility energy to an energy consumer other than the energy consumer who generates a supply level of the amount of utility energy.

Still referring to FIG. 1, in preferred energy distribution system 20, the use of utility assets is reduced because the energy storage unit and the e-cloud distribute energy when the energy distribution system has peak-loaded conditions and store energy when the system has minimal-load conditions. Still further, in preferred energy distribution system 20, the utility is able to use an energy consumer's excess or surplus energy during periods when it is most valuable to the utility. More particularly, preferred energy distribution system 20 is adapted to purchase energy from a wholesale distribution utility when energy costs are reduced, e.g. at nighttime. While FIG. 1 illustrates the preferred configuration and arrangement of the system for the storage and distribution of utility energy, it is contemplated within the scope of the invention that the system may be of any suitable configuration and arrangement.

Figure 2:
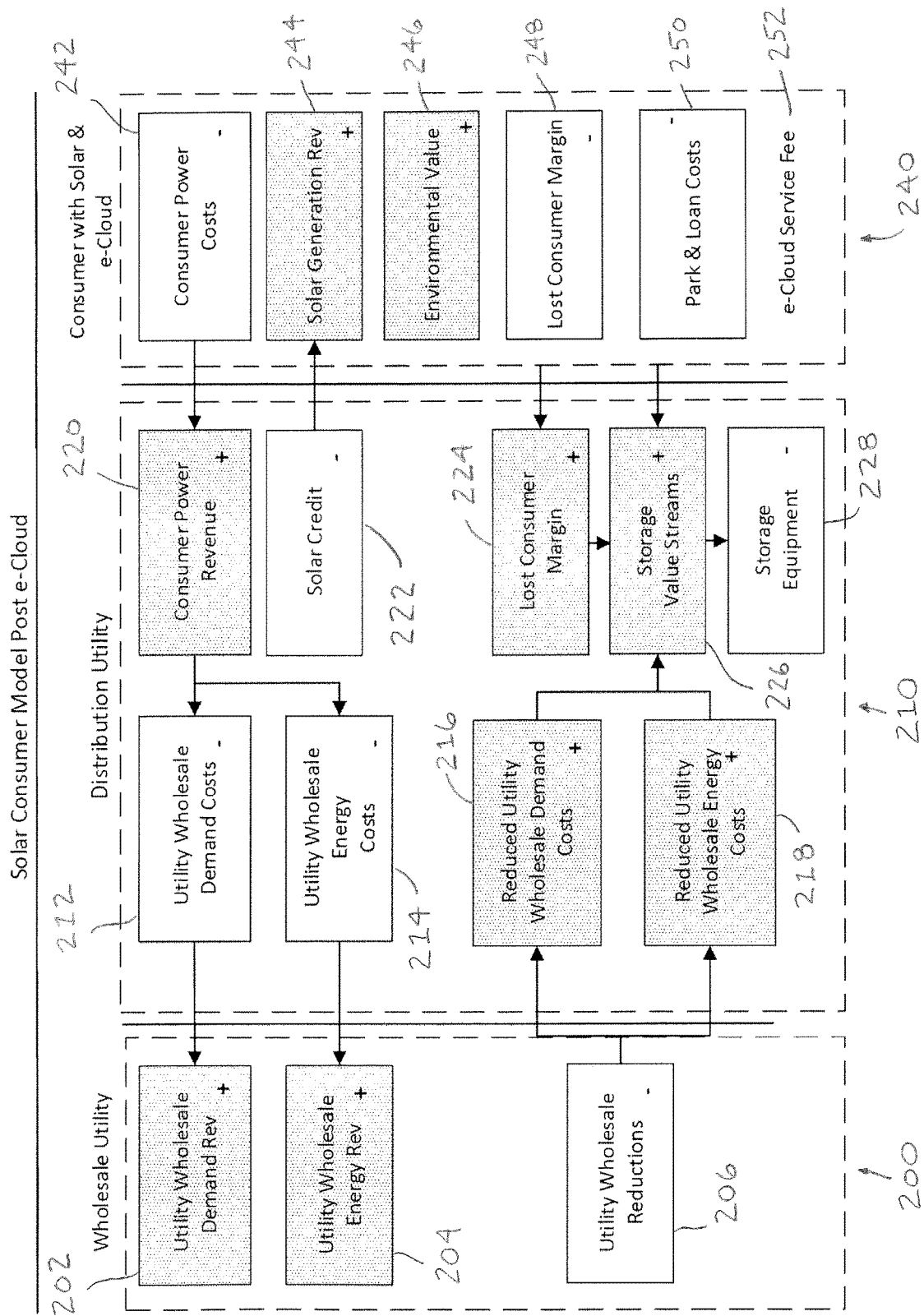
FIG. 2 is a schematic view of the preferred value components for a utility and a consumer provided by the system for storing and distributing an amount of utility energy illustrated in FIG. 1.

Referring now to FIG. 2, a schematic view of the preferred value components for a wholesale utility, a distribution utility, and a consumer provided by preferred system 20 is illustrated. As shown in FIG. 2, preferred value components for a wholesale utility are designated generally by reference numeral 200 and comprise demand revenue 202, energy revenue 204, and reductions 206. In the preferred energy distribution system, the wholesale utility continues to receive demand revenue and energy revenue, but wholesale reductions occur due to reductions in distribution utility consumption of wholesale utility energy Still referring to FIG. 2, preferred value components for a distribution utility are designated generally by reference numeral 210 and comprise utility wholesale demand costs 212, utility wholesale energy costs 214, reduced utility wholesale demand costs 216, reduced utility wholesale energy costs 218, consumer power revenue 220, solar credit 222, lost consumer margin 224, storage value 226, and storage equipment 228. As shown in FIG. 2, the distribution utility reduces wholesale demand costs by reduction of the amount of wholesale utility energy purchased during peak periods of use and reduces the amount of energy costs by purchasing more energy during low-use hours when energy prices are lower. This value of injection and withdrawal from the energy storage unit and the e-cloud contributes to offset the cost of the investment in the storage unit and other distribution utility assets. Further, the distribution utility delivers all energy consumed by its energy consumers prior to energy generation. Still further, the distribution utility purchases energy generated by its energy consumers at a higher rate than the wholesale utility rate and allows its energy consumers to retain the value of their renewable energy credit or certificate (REC). The value from the service fees for the virtual storage, e-cloud, and solar purchase program also contributes to offset the cost of the storage units and lost margin from energy consumers choosing to install solar. In addition, the preferred energy distribution system provides improved circuit reliability and reduces the amount of distribution losses by reducing the amount of energy purchased from the wholesale utility and distributing energy from a location closer to the energy consumer.

Still referring to FIG. 2, preferred value components for a consumer are designated generally by reference numeral 240 and comprise consumer power costs 242, solar generation revenue 244, environmental value 246, lost consumer margin 248, park and loan costs 250, and e-cloud service fee 252. More particularly, an energy consumer with solar and e-cloud compensates the distribution utility for all energy consumed and for the park and loan service (injecting and withdrawing energy from the energy distribution system), is compensated for all energy generated from its solar installation, and retains the value of the REC.

Figure 2A:
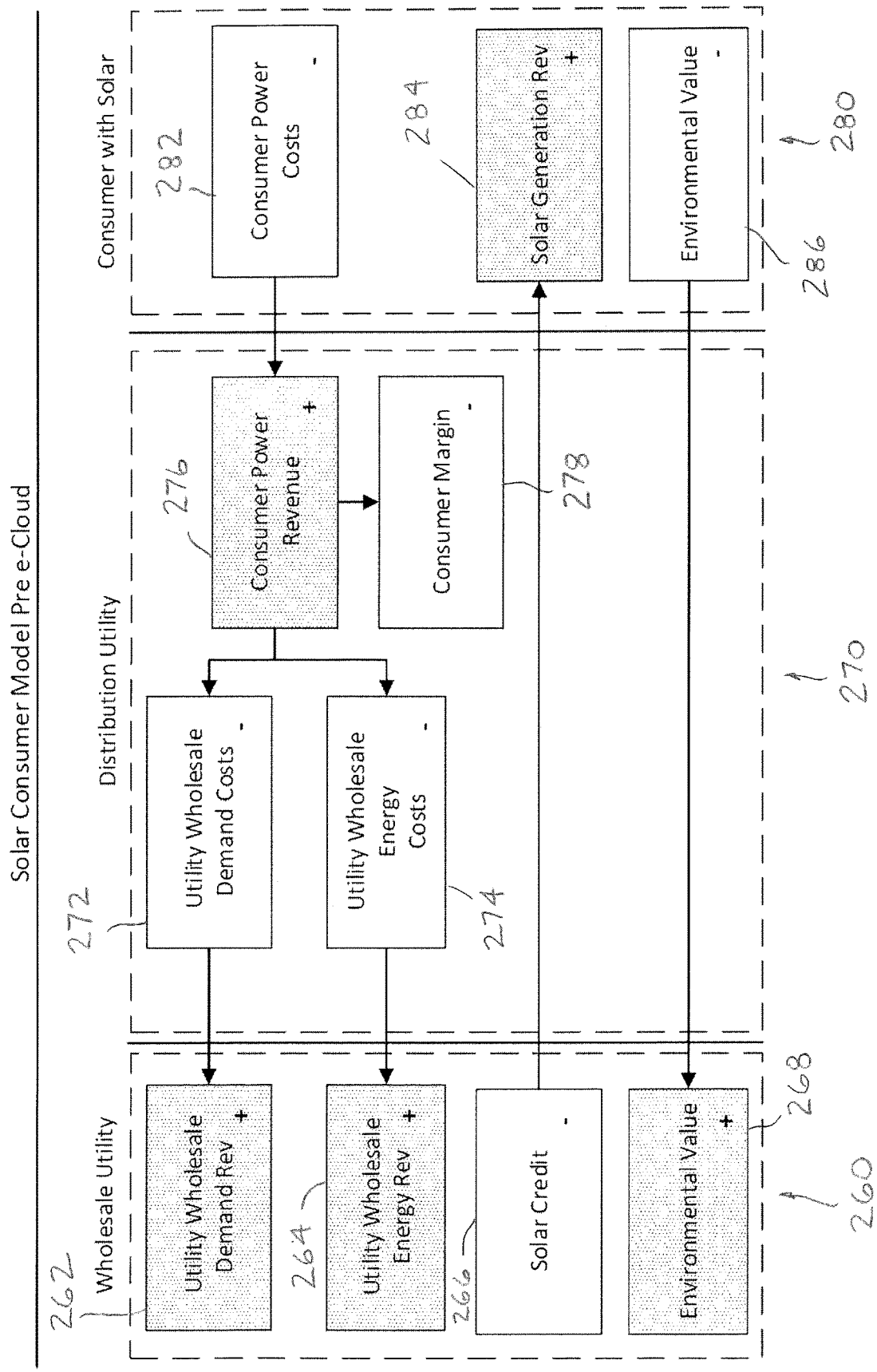
FIG. 2A is a schematic view of the value components for a conventional system for distributing utility energy.

Referring now to FIG. 2A, a schematic view of the value components for a conventional system for distributing utility energy is illustrated. As shown in FIG. 2A, the value components for a wholesale utility are designated generally by reference numeral 260 and comprise demand revenue 262, energy revenue 264, solar credit 266, and environmental value 268. The value components for a distribution utility are designated generally by reference numeral 270 and comprise utility wholesale 272, utility wholesale energy costs 274, consumer power revenue 276, and consumer margin 278. The value components for a consumer are designated generally by reference numeral 280 and comprise consumer power costs 282, solar generation revenue 284, and environmental value 286. More particularly, a wholesale utility compensates an energy consumer directly with a lower value for solar-generated energy, and the wholesale utility retains the value of the REC. In addition, the distribution utility loses revenue related to an energy consumer's generation of solar energy which reduces the net energy consumption. More particularly, in the conventional system, the wholesale utility purchases energy generated by energy consumer's energy generating source and retains the right to the environmental benefit coming from the energy generating source. At the same time, the energy consumer with a solar installation consumes less energy from the distribution utility because the energy consumer is generating its own energy from its energy-generating source.

Figure 3:
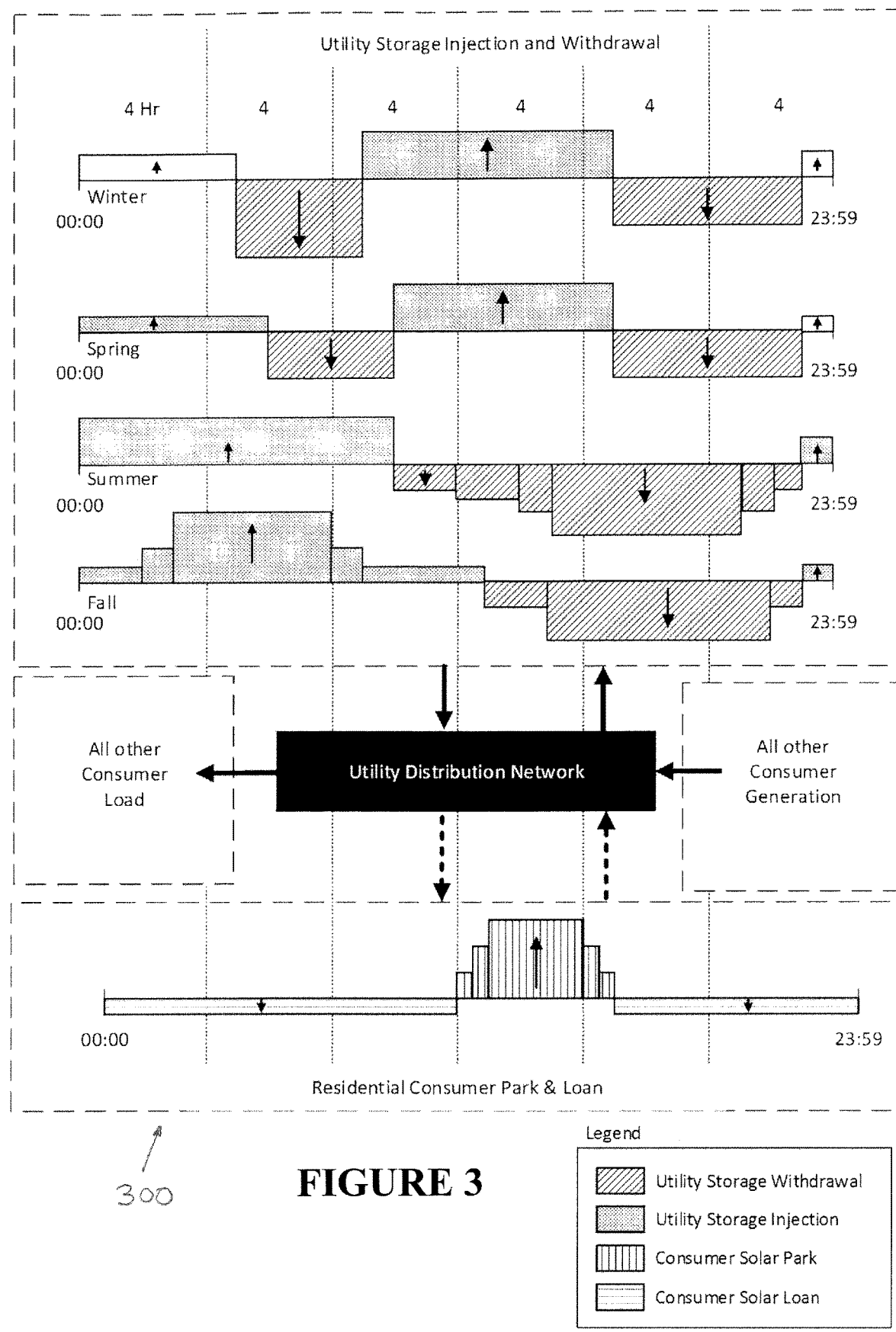
FIG. 3 is a schematic view of the preferred utility storage asset operational system of the system for storing and distributing an amount of utility energy illustrated in FIGS. 1 and 2.

Referring now to FIG. 3, a schematic view of preferred utility storage asset operational system of system for storing and distributing an amount of utility energy 20 is illustrated. As shown in FIG. 3, the preferred utility storage asset operational system is designated generally by reference numeral 300. Preferred utility storage asset operational system 300 comprises utility storage injection and withdrawal, consumer park and loan, utility distribution network, other consumer generation, and other consumer load. More particularly, distribution utility injection preferably occurs during off-peak usage hours in the winter, spring, summer, and fall. Distribution utility withdrawal preferably occurs during peak-usage hours in the winter, spring, summer, and fall. Preferably, residential energy consumers inject surplus energy into the energy distribution system when their energy generation is greater than their energy demands and withdraw energy from the system when their energy demands exceed their energy generation. While FIG. 3 illustrates the preferred configuration and arrangement of the utility storage asset operational system, it is contemplated within the scope of the invention that the utility asset operational system may be of any suitable configuration and arrangement.

Figure 4:
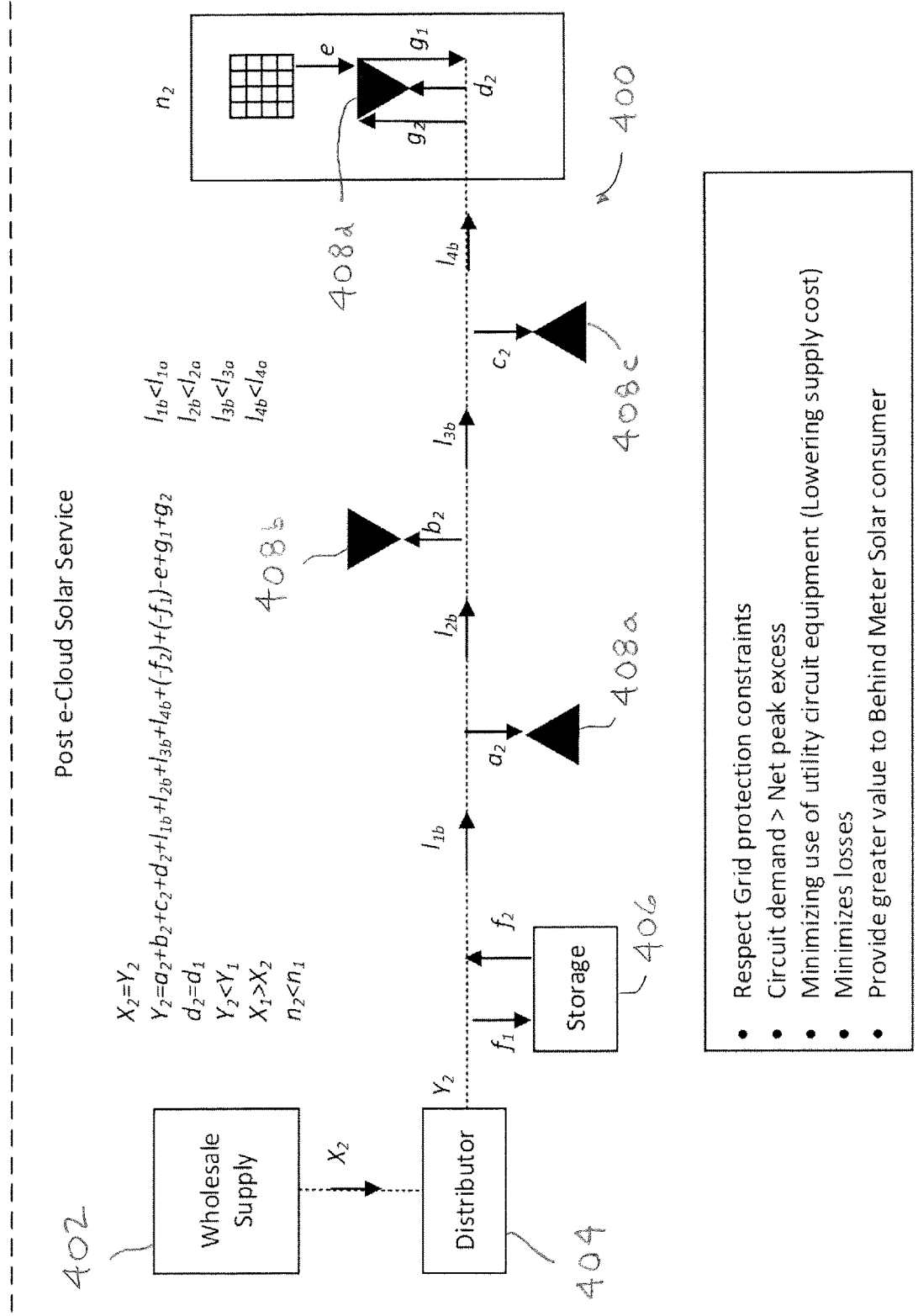
FIG. 4 is a schematic view of an exemplary circuit of the system for storing and distributing an amount of utility energy illustrated in FIGS. 1, 2, and 3.

Referring now to FIG. 4, a schematic view of an exemplary circuit of preferred system for storing and distributing an amount of utility energy 20 is illustrated. As shown in FIG. 4, the exemplary circuit is designated generally by reference numeral 400. Exemplary circuit 400 comprises wholesale utility 402, distribution utility 404, storage unit 406, and energy consumers 408a, 408b, 408c, and 408d. Exemplary circuit 400 is programmed to operate in accordance with the illustrated algorithms in which:

$X_2$ is the total power revenues for wholesale supplier post Consumer participation in E-cloud $Y_2$ is the total power revenues and losses for distribution supplier post Consumer participation in E-cloud $a_2$ is consumer a's electric costs (no solar) post Consumer participation in E-cloud $b_2$ is consumer b's electric costs (no solar) post Consumer participation in E-cloud $c_2$ is consumer c's electric costs (no solar) post Consumer participation in E-cloud $d_2$ is consumer d's electric costs (with solar) post Consumer participation in E-cloud $l_{1b}$ are electric losses for circuit segment 1 post Consumer participation in E-cloud $l_{2b}$ are electric losses for circuit segment 2 post Consumer participation in E-cloud $l_{3b}$ are electric losses for circuit segment 3 post Consumer participation in E-cloud $l_{4b}$ are electric losses for circuit segment 4 post Consumer participation in E-cloud e is the output from consumer solar generation installation $f_1$ is value from storage injections $f_2$ is the value from storage withdrawals $g_1$ is excess solar generation going to E-cloud $g_2$ is E-cloud withdrawals and delivery to consumer $n_2$ is solar consumer value post consumer participation in E-cloud More particularly, wholesale utility 402 delivers $X_2$ to distribution utility 404. Distribution utility 404 delivers $Y_2$. Preferably, X2 equals Y2. Distribution utility consumers without solar installations $a_2$, $b_2$, and $c_2$, plus distribution utility consumer with a solar installation $d_2$, plus distribution utility losses $l_{1b}$, $l_{2b}$, $l_{3b}$, and $l_{4b}$, plus storage injection $f_1$ or minus storage withdrawal $f_2$, minus e, plus $g_1$ and $g_2$ equals $Y_2$. In addition, $Y_2$ is less than $Y_1$ (see FIG. 4A), $X_2$ is less than $X_1$ (see FIG. 4A), $n_2$ is less than $n_1$ (see FIG. 4A), $l_{1b}$ is less than $l_{1a}$ (see FIG. 4A), $l_{2b}$ is less than $l_{2a}$ (see FIG. 4A), $l_{3b}$ is less than $l_{3a}$ (see FIG. 4A), and $l_{4b}$ is less than $1_{4a}$ (see FIG. 4A). As shown in FIG. 4, $n_2$ represents an energy consumer having an energy generating source adapted to receive energy from and transmit energy to an energy storage unit such as a battery or an e-cloud. An $n_2$ energy consumer receives energy from distribution utility in the amount of $d_2$, delivers excess energy $g_1$ to the energy distribution system when the energy consumer's energy consumption is less than its energy generation and receives withdrawal energy $g_2$ from the energy distribution system when the energy consumer's energy generation is less than its consumption. While FIG. 4 illustrates the preferred configuration and arrangement of the exemplary circuit, it is contemplated within the scope of the invention that the exemplary circuit may be of any suitable configuration and arrangement.

Figure 4A:
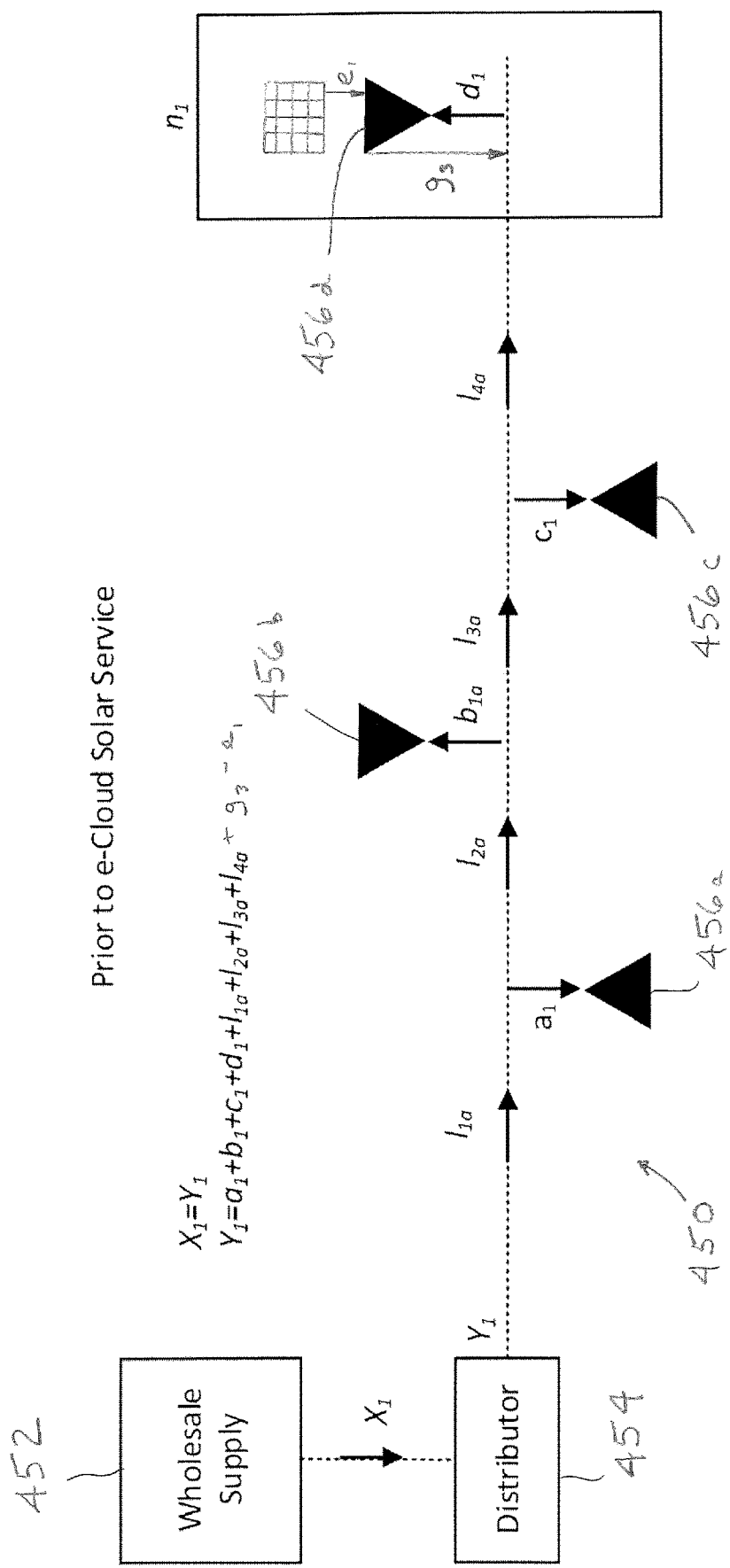
FIG. 4A is a schematic view of a conventional circuit.

Referring now to FIG. 4A, a schematic view of a conventional circuit is illustrated. As shown in FIG. 4A, the conventional circuit is designated generally by reference numeral 450. Conventional circuit 450 comprises wholesale utility 452, distribution utility 454, and energy consumers 456a, 456b, 456c, and 456d. Conventional circuit 450 is programmed to operate in accordance with the illustrated algorithms in which:

$X_1$ is the total power revenues for wholesale supplier prior to Consumer participation in E-cloud $Y_1$ is the total power revenues and losses for distribution supplier prior to Consumer participation in E-cloud $a_1$ is consumer a's electric costs (no solar) prior to Consumer participation in E-cloud $b_1$ is consumer b's electric costs (no solar) prior to Consumer participation in E-cloud $c_1$ is consumer c's electric costs (no solar) prior to Consumer participation in E-cloud $d_1$ is consumer d's electric costs (with solar) prior to Consumer participation in E-cloud $e_1$ is the output from consumer solar generation installation $g_3$ is excess solar generation transmitted to the wholesale utility $l_{1a}$ are electric losses for circuit segment 1 prior to Consumer participation in E-cloud $l_{2a}$ are electric losses for circuit segment 2 prior to Consumer participation in E-cloud $l_{3a}$ are electric losses for circuit segment 3 prior to Consumer participation in E-cloud $l_{4a}$ are electric losses for circuit segment 4 prior to Consumer participation in E-cloud $n_1$ is solar consumer value prior to consumer participation in E-cloud More particularly, a wholesale utility 452 delivers $X_1$ to distribution utility 454. Distribution utility delivers $Y_1$. Preferably, $X_1$ equals $Y_1$. Energy consumers without a solar installation $a_1$, $b_1$, and $c_1$, plus energy consumer with a solar installation $d_1$, plus energy distribution losses $l_{1a}$, $l_{2a}$, $l_{3a}$, and $l_{4a}$, minus $e_1$, plus $g_3$ equals $Y_1$. As shown in FIG. 4A, $n_1$ represents a distribution utility consumer with an energy generating source but no access to an energy storage unit or an e-cloud. As also shown in FIG. 4A, the conventional circuit does not include a storage unit or an e-cloud and $n_1$ receives energy distribution utility in the amount of $d_1$. As noted above, in the conventional energy distribution system, $X_1$ is greater than $X_2$, and $Y_1$ is greater than $Y_2$, i.e. the revenue paid by the distribution utility to the wholesale utility in the conventional energy distribution system is greater than the revenue paid in the preferred energy distribution system, the revenue paid by the distribution utility to its energy consumers in the conventional energy distribution system is greater than the revenue paid in the preferred energy distribution system, and the electric distribution losses experienced in the convention energy distribution system are greater than the electric distribution losses experienced in the preferred energy distribution system.

Figure 5:
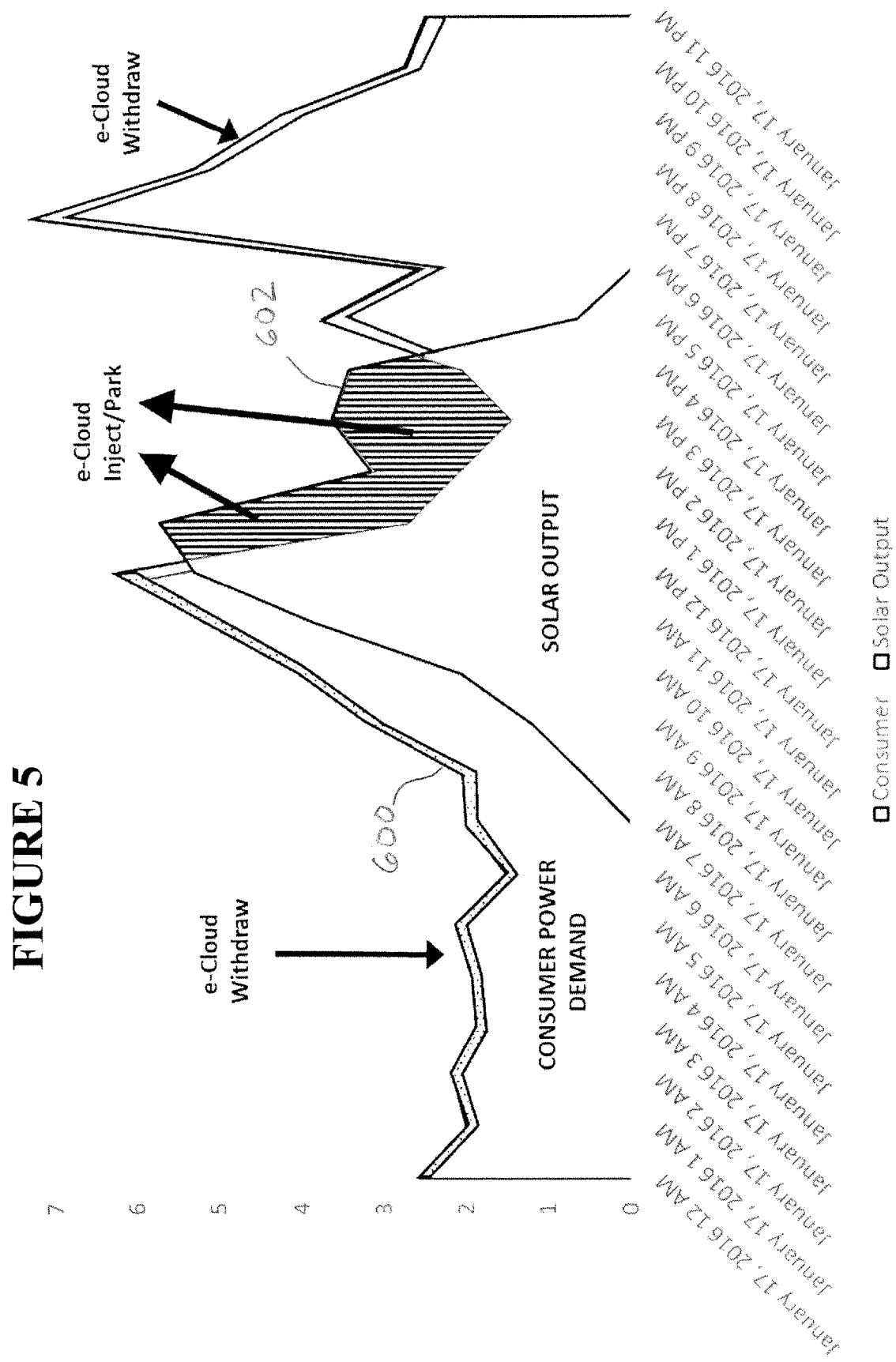
FIG. 5 is a graphical illustration of an exemplary consumer demand and solar output over a twenty-four (24) hour period of time.

Referring now to FIG. 5, a graphical depiction of an exemplary consumer demand and solar output over a twenty-four (24) hour period of time is illustrated. As shown in FIG. 5, consumer energy demand is illustrated by line 600 and solar output is illustrated by line 602. Solar output that exceeds consumer energy demand is received by and stored in one or more storage units (not shown). By contrast, when consumer energy demand exceeds solar output, output received by and stored in the one or more storage units and/or e-cloud is distributed form the one or more storage units and/or e-cloud to the consumer.

The invention also comprises a method for storing and distributing an amount of utility energy. The preferred method comprises providing a system for storing and distributing an amount of utility energy. The preferred system comprises an energy generation source that is adapted to generate a supply level of the amount of utility energy, an energy consumer that has a demand level of the amount of utility energy, an energy storage unit that is adapted to receive and store a first portion of the amount of utility energy from the energy generation source and distribute a second portion of the amount of utility energy to the energy consumer, a processor that is adapted to control the distribution of the amount of utility energy to and from the energy storage unit, an e-cloud that is adapted to communicate with the energy storage unit, and a utility that is adapted to communicate with the system for storing and distributing an amount of energy. In the preferred embodiments of the system, the processor causes the first portion of the amount of utility energy to be stored in the energy storage unit when the supply level of the amount of utility energy exceeds the demand level of the energy consumer and causes the second portion of the amount of utility energy to be distributed to the energy consumer when the demand level of the energy consumer exceeds the supply level of the energy generation source. The preferred method further comprises controlling the storage of the first portion of the amount of utility energy and the distribution of the second portion of the amount of utility energy.

In other preferred embodiments of the method, the method further comprises storing the first portion of the amount of utility energy to be stored in the energy storage unit when the supply level of the amount of utility energy exceeds the demand level of the energy consumer and distributing the second portion of the amount of utility energy to be distributed to the energy consumer when the demand level of the energy consumer exceeds the supply level of the energy generation source. In still other preferred embodiments of the method, the system is adapted to receive and store the first portion of the amount of utility energy from a plurality of energy generation sources and distribute the second portion of the amount of utility energy to a plurality of energy consumers. In other preferred embodiments of the method, the system allows the utility to store and distribute a consumer's excess or surplus energy during periods when it is most valuable to the utility.

In operation, several advantages of the preferred embodiments of the system and method for the storage and distribution of utility energy are achieved. For example, the preferred embodiments of the system and method effectively and efficiently store and distribute output from DER with high output variability such as solar panels. The preferred embodiments of the system and method provide sufficient resiliency, redundancy, and flexibility and sufficiently minimize the use of utility assets and losses. The preferred embodiments of the system and method effectively and efficiently address service disruptions and outages. The preferred embodiments of the system and method optimize the value of DER and solar panel installations. In addition, the preferred embodiments of the system and method minimize overhead costs and wear and tear on the system and its component parts. The preferred embodiments of the system and method minimize any adverse impacts on the environment. The preferred embodiments of the system and method allow a utility to use a consumer's excess or surplus energy during periods when it is most valuable to the utility.

More particularly, the availability of excess output from a consumer's solar panels and its value to the utility serving the consumer varies throughout the day. The greatest value is available when the excess output is available at the time of greatest demand for electricity by all of the utility's consumers. Conventional systems and methods include the installation of batteries at the consumer's location for storage of excess output from the consumer's solar panels. However, it is not economical if the stored output is only available to permit use by the consumer and not by the utility. In addition, conventional utilities set prices for the purchase of excess output from their consumer's solar installations at lower levels because the utilities cannot use the excess output during periods when it is most valuable to the utility. In another conventional approach, commonly referred to as net metering, higher effective prices are paid to consumers for excess solar output (equal to the retail price paid by the consumer for electricity), but then the utility on average pays too much because there still is no ability to use the excess output when it is most valuable to the utility.

By contrast, the preferred embodiments of the system and method of the invention recognize that electricity has different values at different times and provide a system to permit a utility to capture greater value from solar generation or other DER in excess of what is needed at the location of the DER. The preferred embodiments of the system and method accomplish this by providing a system that stores excess output from consumer solar power installations in storage facilities owned and controlled by the utility at remote locations on the electric distribution system. The utility-controlled storage permits the utility to use the excess output at times and in amounts that will maximize value to the utility and to other energy consumers, e.g. system reliability, reduced electricity losses, reduces use of utility assets, and the like. The consumer may use the excess energy output the consumer has put into storage whenever on-site generation does not provide all of the consumer's electricity needs.

In addition, the preferred embodiments of the system and method of the invention provide support for utility microgrids through the increased capacity and use of energy storage devices that increase system reliability and resiliency through islanding. The preferred embodiment of the system and method of the invention also provide improved power quality and conditioning through the use of storage for immediate contribution of variable load, demand, and back-up power. Further, the preferred embodiments of the system and method of the invention provide reduced or deferred electric distribution system investments such as transformers, additional line capacity, breakers, capacitors, and the like.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. An energy distribution system for storing and distributing an amount of utility energy, said energy distribution system comprising:
   (a) an energy generation source, said energy generation source being adapted to generate a supply level of the amount of utility energy and transmit said supply level of the amount of utility energy to the energy distribution system;
   (b) an energy consumer, said energy consumer having a demand level of the amount of utility energy;
   (c) an energy storage unit, said energy storage unit being adapted to receive and store a first portion of the amount of utility energy from the energy generation source and distribute a second portion of the amount of utility energy to the energy consumer;
   (d) an e-cloud, said e-cloud being adapted to receive a third portion of the amount of utility energy from the energy generation source and distribute a fourth portion of the amount of utility energy to the energy consumer,
   (e) a processor; said processor being adapted to control the distribution of the amount of utility energy to and from the energy storage unit and the e-cloud;
   (f) a utility, said utility being adapted to communicate with the energy distribution system for storing and distributing an amount of utility energy;
   wherein the processor causes the first portion of the amount of utility energy to be stored in the energy storage unit and the third portion of the amount of utility energy to be received by the e-cloud when the supply level of the amount of utility energy exceeds the demand level of the energy consumer; and wherein the processor causes the second portion of the amount of utility energy and the fourth portion of the amount of utility energy to be distributed to the energy consumer when the demand level of the energy consumer exceeds the supply level of the energy generation source.

2. The energy distribution system of claim 1 wherein the energy generation source comprises a solar panel.

3. The energy distribution system of claim 1 wherein the energy storage unit comprises a battery.

4. The energy distribution system of claim 1 wherein the energy storage unit is controlled by the utility.

5. The energy distribution system of claim 1 wherein the energy storage unit is controlled by the utility.

6. The energy distribution system of claim 1 wherein the processor comprises a programmable logic controller.

7. The energy distribution system of claim 1 further comprising an inverter.

8. The energy distribution system of claim 1 further comprising a transformer.

9. The energy distribution system of claim 1 further comprising a cable.

10. The energy distribution system of claim 1 wherein the energy generation source comprises an intermittent energy generation source.

11. The energy distribution system of claim 1 further comprising a relay.

12. The energy distribution system of claim 1 further comprising a switch.

13. The energy distribution system of claim 1 further comprising a fuse.

14. The energy distribution system of claim 1 wherein the use of utility assets is reduced.

15. The energy distribution system of claim 1 wherein the energy consumer retains an REC.

16. A method for storing and distributing an amount of utility energy, said method comprising:
   (a) providing an energy distribution system for storing and distributing the amount of utility energy, said energy distribution system comprising:
      (i) an energy generation source, said energy generation source being adapted to generate a supply level of the amount of utility energy and transmit said level of the amount of utility energy to the energy distribution system;
      (ii) an energy consumer, said energy consumer having a demand level of the amount of utility energy;
      (iii) an energy storage unit, said energy storage unit being adapted to receive and store a first portion of the amount of utility energy from the energy generation source and distribute a second portion of the amount of utility energy to the energy consumer;
      (iv) an e-cloud, said e-cloud being adapted to receive a third portion of the amount of utility energy from the energy generation source and distribute a fourth portion of the amount of utility energy to the energy consumer;
      (v) a processor; said processor being adapted to control the distribution of the amount of utility energy to and from the energy storage unit and the e-cloud;
      (vi) a utility, said utility being adapted to communicate with the energy distribution system for storing and distributing an amount of utility energy;
      wherein the processor causes the first portion of the amount of utility energy to be stored in the energy storage unit and the third portion of the amount of utility energy to be received by the e-cloud when the supply level of the amount of utility energy exceeds the demand level of the energy consumer; and wherein the processor causes the second portion of the amount of utility energy and the fourth portion of the amount of utility energy to be distributed to the energy consumer when the demand level of the energy consumer exceeds the supply level of the energy generation source;
   (b) controlling the storage of the first portion and the third portion of the amount of utility energy and the distribution of the second portion and the fourth portion of the amount of utility energy.

17. The method of claim 16 further comprising:
   (c) storing the first portion of the amount of utility energy to be stored in the energy storage unit when the supply level of the amount of utility energy exceeds the demand level of the energy consumer; and, (d) distributing the second portion of the amount of utility energy to be distributed to the energy consumer when the demand level of the energy consumer exceeds the supply level of the energy generation source.

18. The method of claim 16 wherein the system is adapted to receive and store the first portion and the third portion of the amount of utility energy from a plurality of energy generation sources.

19. The method of claim 16 wherein the system is adapted to distribute the second portion and the fourth portion of the amount of utility energy to a plurality of energy consumers.

20. The method of claim 16 wherein the system allows the utility to use a consumer's excess or surplus energy during periods when it is most valuable to the utility.

* * * * *